United States Patent Office 3,372,983
Patented Mar. 12, 1968

3,372,983
CHEMICAL PROCESSES AND PRODUCTS
RESULTING THEREFROM
Edward L. Moore, St. Louis, Mo., assignor to Monsanto
Company, a corporation of Delaware
No Drawing. Filed Dec. 23, 1963, Ser. No. 332,852
6 Claims. (Cl. 23—106)

ABSTRACT OF THE DISCLOSURE

A sodium tripolyphosphate product having improved hydration characteristics and exhibiting a new X-ray diffraction pattern, and a process for producing the new improved crystalline sodium tripolyphosphate comprising lowering the temperature of heated, low temperature form sodium tripolyphosphate at an average rate of at least about 25° C. per minute through the temperature range of 350° C. to 125° C.

The present invention relates to processes for manufacturing sodium tripolyphosphate. More specifically, the present invention relates to processes for manufacturing crystalline sodium tripolyphosphate containing strained crystals, and to the novel products resulting therefrom.

Most of the sodium tripolyphosphate that is manufactured today is intended to be utilized in processes for manufacturing detergents. For various reasons, different detergent manufacturers generally require sodium tripolyphosphate products having often widely varying hydration properties. Consequently, manufacturers of sodium tripolyphosphate who wish to remain competitive must offer for sale a wide variety of sodium tripolyphosphate products. The hydration properties of the various sodium tripolyphosphate products that are offered for sale are practically invariably dependent upon varying ratios of the Form I and Form II sodium tripolyphosphate crystalline forms in these products. Generally products having larger amounts of the Form I material hydrate more rapidly than those containing higher proportions of the Form II material. Until the time of the present invention, about the only way tripolyphosphate manufacturers had available to them of regulating or controlling the hydration characteristics of their sodium tripolyphosphate products was to produce products having specific ratios of Form I and Form II materials contained therein. Thus a very fast hydrating product generally contained practically all Form I, while a very slow hydrating material contained practically all Form II materials, and products containing mixtures of Form I and Form II material hydrated at rates intermediate between these extremes.

In calcining processes for manufacturing the sodium tripolyphosphate products, it is often difficult to control the various important factors (such as the calciner temperature profile, the calciner feed rate, the calciner gas inlet and exit temperatures, etc.) sufficiently accurately to obtain the desired ratio of Form I to Form II materials in the product. Thus, there has been a need for some time in the phosphate manufacturing art for some method whereby sodium tripolyphosphate manufacturers might have some additional degrees of freedom in their over-all processes, so that they might more accurately (and more often) produce materials within specification; i.e., having certain specified or desired hydration characteristics.

It is an object of the present invention to provide improved processes for manufacturing sodium tripolyphosphate, which processes have greater flexibility in the control of the hydration characteristics of the products resulting therefrom than simply balancing the ratios of Form I and Form II materials contained therein.

It is another object of the present invention to provide novel Form II sodium tripolyphosphate having hydration characteristics that differ substantially from those of conventional Form II material.

These objects, as well as others which will become apparent from the following discussion and claims, are achieved by introducing strain into crystals of the Form II fraction of the sodium tripolyphosphate product. Introduction of the strain is accomplished by cooling hot calciner product tripolyphosphate containing at least some Form II crystals very quickly through a critical temperature range to below about 140° C. The amount of strain that is introduced into the Form II crystalline fraction of the product is apparently proportional to the actual rate of cooling of the hot tripolyphosphate through the critical temperature range; the faster the rate of cooling, the more strain is introduced into the treated product.

Anhydrous sodium tripolyphosphate exists in two well-known crystalline forms or modifications; Form I, the so-called "high temperature" form and Form II, the "low temperature" form. These crystalline forms are readily identifiable by means of their X-ray spectra. Apparently the only crystalline form of sodium tripolyphosphate that can be strained in accordance with the processes of the present invention is the low temperature form (Form II). This is true whether or not the Form II material is mixed or blended with Form I material (or for that matter with practically any other material that is not reactive with the Form II material) at any stage of the processes of this invention.

The critical temperature range through which the hot sodium tripolyphosphate product must be cooled at the accelerated rates of the processes of this invention is that region within which the crystalline strains can be removed by tempering; i.e., generally from about 250° C. to below about 140° C., and preferably to below about 125° C. Thus, if strained crystals are held within this critical temperature range for longer than about 5 minutes, some of the "strains" begin to be relieved, with the result that some of the "strained" Form II material reverts back to ordinary Form II crystals. Actually, since it has been observed that proportionately greater strains can be introduced into the Form II crystals when they are cooled at the accelerated rates starting with temperatures significantly above the upper limit of this "tempering" range, a preferred embodiment of the processes of the present invention encompasses cooling the hot sodium tripolyphosphate product at an average rate of at least about 25° C. per minute through the temperature range of from about 300° C. to about 140° C., and still further preferred; through the entire temperature range of from about 350° C. down to at most about 140° C. (and preferably down to at most about 125° C.). Variations in rates of cooling or heating below this critical range apparently have no significant influence on the strains introduced into the Form II crystals via the processes of this invention. However, if "strained" crystals are held at a temperature significantly above about 140° C. (preferably at about 150° C. or higher) within this critical temperature range for a period of time it has been discovered that the strains disappear, yielding conventional Form II material. Since the strains are removed when the temperature of the strained crystals is held within this critical temperature region for a period of time, this region is termed the "tempering" region. Generally at lower levels of temperature within this region relatively longer periods of time are required to "temper" the material so that all of the strains disappear therefrom, while at relatively high temperatures within the "tempering" range only fairly short tempering periods are required to remove the strains. For example, at a "tempering" temperature of about 160° C. from about 30 minutes to about an hour is required to remove all of the Form II sodium tripolyphosphate crystal strains, while at about 250° C. only several minutes are required. The particular history of the hot sodium tripolyphosphate product prior to the time it is subjected to these accelerated cooling rates is believed irrelevant. For example, the material could have been manufactured (i.e., from appropriate orthophosphate raw materials) just prior to the accelerated cooling step of this invention. (Indeed, the product may even contain significant quantities of unconverted orthophosphate and/or alkali metal polyphosphates in addition to the Form II material which is actually strained.) Or the material may even be sodium tripolyphosphate that has been reheated to above the critical temperature range, and then quickly cooled, for the specific purpose of introducing strains into the Form II crystals contained therein in accordance with the present invention.

The average rate of cooling through the above-described critical temperature range that is believed necessary in order to produce the strained sodium tripolyphosphate crystals of the present invention is at least about 25° C. per minute. For highest orders of straining, the temperature of the hot sodium tripolyphosphate product should be lowered through the critical temperature range at an average rate of at least about 40° C. per minute. Thus, the maximum amount of time that should be required to reduce the temperature of hot (i.e., 300° C.) sodium tripolyphosphate product to below about 140° C. is about 7 minutes, and is preferably about 4 minutes.

Surprisingly, the strained Form II sodium tripolyphosphate crystals have hydration characteristics quite unlike "regular" or conventional Form II material. In general, except for the actual amount of heat evolved during their hydration, the strained Form II crystals hydrate in a manner very similar to that in which Form I crystals hydrate. For example, whereas regular (unstrained) practically pure (i.e., <1.5% Form I) Form II sodium tripolyphosphate would be expected to require as long as about 80 minutes to become practically completely hydrated in a given aqueous solution of sodium sulfate, a sample of the same Form II product which was cooled through the critical temperature range at an average rate of about 35° C. per minute surprisingly became completely hydrated in less than half that time. Similar results can be observed by comparing the hydration rates of conventional products containing Form II with "strained" products in typical detergent slurries.

In terms of advantages that the present invention lends to processes for manufacturing sodium tripolyphosphate products (by far the greater majority of which contain significant amounts of the Form II crystalline variety), it can be appreciated that by controlling the particular rate of cooling in order to get some crystalline strain, one can manufacture products having certain particular hydration characteristics, for a given customer, for example, by cooling hot sodium tripolyphosphate having more than the desired amount of Form II material at a rate sufficient to produce the crystalline strains described hereinbefore, the tripolyphosphate product can be converted into a product having the hydration characteristics desired by this customer. If the product contains only slightly more than the desired level of Form II material, cooling rates of 25–30° C. per minute through the critical temperature range can be utilized, while if the product contains considerably more Form II material (over that believed to be desired in accordance with conventional practice) still higher rates of cooling should be utilized.

While the present invention can be successfully practiced upon any sodium tripolyphosphate product that contains at least some of the Form II crystalline variety, generally the advantages described hereinbefore can best be appreciated when the tripolyphosphate product contains at least about 20 weight percent of Form II material.

Optimum results can be obtained when the tripolyphosphate product contains at least about 70 weight percent of Form II material, since in the presence of very large amounts of the Form I variety, insofar as usage of the tripolyphosphate product in detergent processes is concerned, the advantages of strained versus unstrained Form II crystals become increasingly less obvious with increasing levels or proportions of Form I material.

The strain that is introduced into the Form II crystals in accordance with the present invention can be readily detected by the unexpected shift that occurs in one or more of the major Form II X-ray diffraction lines or peaks occurring above about 50° $2\theta$. Apparently the peak that is best or easiest to utilize in the identification of the strained Form II crystals of this invention is the one that occurs at a corrected Bragg angle of about 55.35° $2\theta$. This particular peak might occur, of course, at any point within a very close proximity of this angle; for example, at a Bragg angle of between about 55.3 and about 55.4° $2\theta$ (after the usual correction for half penetration has been applied); depending upon the way the particular sample is packed in the X-ray diffraction instrument, or whether or not the instrument is accurately calibrated at the time it is used. However, the actual absolute position of the peak is not critical. Whether or not a particular sodium tripolyphosphate product is strained in accordance with the present invention can be determined with extreme accuracy and dependability by first preparing a given sample of the product for X-ray diffraction analysis via a manipulative procedure such as that detailed in Example 1, below; subjecting the sample to X-ray diffraction analysis, noting particularly the position of the major Form II peak occurring at about 55.4 as described hereinbefore; subsequently tempering this same sample (preferably without disturbing the sample in the cylindrical sample holder) at a temperature of about 160° C. for several hours (generally 2 hours is believed sufficient, but for about 6 hours or more to be sure); and subsequently accurately determining the position of the same major Form II peak of the tempered product. The tempered product represents the substantially unstrained, conventional product. Using this procedure, if the actual positions of the two peaks differ by more than about 0.01° $2\theta$ (using copper K$\alpha$ radiation) the original sample was strained, and thus falls within the scope of the present invention.

In the following examples, which are illustrative of some of the preferred embodiments of the present invention, all parts given are by weight unless otherwise specified.

*Example 1*

Into a conventional countercurrently-heated, gas fired stainless steel rotary calciner are charged a mixture containing 29.8 parts of powdered (—100 mesh) monosodium orothophosphate and 70.2 parts of powdered (—100 mesh) disodium orthophosphate. The Na/P ratio of the mixture is 1.67. Over the next 15 minutes, the temperature of the mixture is then gradually raised to about 450° C. At this point, one-half of the product is cooled quickly, its temperature being lowered through the temperature range of from 450° C. to about 135° C. at an average rate of about 35° C. per minute. This half that is cooled quickly will herein be referred to as "Product A." The remaining half of the product (hereinafter called "Product B") is allowed to cool through this temperature range at an average rate of about 8–12° C. per minute, approximately simulating conventional cooling of typical hot sodium tripolyphosphate calciner products. Analysis by well-known X-ray diffraction techniques reveal that both products from Example 1 contain about 73 weight percent Form II and about 27 weight percent Form I sodium tripolyphosphate and essentially no unreacted orthophosphates.

"Product A" and "Product B" are then formulated into a typical detergent process as follows. Initially a precursor slurry containing the following ingredients is prepared by simply stirring the ingredients together in a stainless steel mixing vessel for 1 hours:

| Ingredient: | Parts |
| --- | --- |
| Sodium tridecylbenzene sulfonate slurry (52% solids) | 270 |
| Sodium sulfate | 5 |
| Sodium silicate solution ($Na_2O/SiO_2$ ratio=2.5 37% solids) | 45 |
| Sodium carboxymethylcellulose | 2 |
| Water | 35 |

The precursor slurry is then warmed to 60° C., and divided into two equal parts. Into one-half of the slurry, 65 parts of "Product A" is introduced while the slurry is being stirred vigorously. Into the other half, 65 parts of "Product B" are introduced in essentially the same manner. By following closely the viscosity and the heat evolved from each slurry during the next 2 hours, the rate of tripolyphosphate hydration for each product is then determined. Although "Product A" and "Product B" contain the same relative amounts of Form I to Form II crystals, "Product A" is found to hydrate considerably faster than "Product B" in these otherwise substantially identical detergent slurries. The hydration characteristics (including the slurry viscosity) of "Product A" are similar to those of a conventional sodium tripolyphosphate product containing as much as 43 weight percent Form I material (and only about 57 weight percent of Form II material).

In order to determine whether or not "Product A" and/or "Product B" contains crystals that are strained in accordance with the present invention, a sample of each material is analyzed as follows.

About 2 grams of powdered (substantially all −270 mesh) sample are weighed to the nearest 0.1 milligram. This sample is then packed into a 2.5 cm. diameter cylindrical X-ray sample holder. The bulk density of the sample, after being packed in the sample holder under a 1,000 p.s.i.g. pressure (for 30 seconds) in a Carver press, is calculated from the volume of the compressed powder, which in turn is found by comparing the depth of packing of the preweighed material with the total depth of the empty sample holder. Following this procedure, the bulk density of samples of both "Product A" and "Product B" are found to be 1.613 grams per cubic centimeter.

X-ray measurements are then made on each of these samples, using a standing Norelco X-ray diffractometer equipped with a Phillips high intensity copper target X-ray tube. The detector is a conventional scintillation counter. Copper Kα radiation is obtained by use of a nickel filter. The diffractometer is equipped with a step-scanning device to permit steps of 0.01° 2θ to be observed. Fixed time counting of about 100 seconds per step is used. The samples, one at a time, are placed in the sample position in the diffractometer, and a scan is obtained in 0.01 2θ steps through the range of 54.9 to 55.9° 2θ. (In this instance to study the peak that occurs normally at about 55.4° 2θ.) The resulting data is then plotted by conventional methods, and the exact peak position thus determined.

Since beam penetration into the sample must be corrected, the following correction is then made for each sample tested, following the well-known formula (1) $$X_{hv} = \frac{0.346}{(u/p)p}$$

where:

$u/p$ = mass absorption coefficient of sodium tripolyphosphate
$p$ = bulk density of the sample
$u$ = linear absorption coefficient for sodium tripolyphosphate at wave length (in this instance, at 1.54 Angstroms for copper radiation).

The mass absorption coefficient is calculated from the elemental absorption coefficients and the particular composition being tested. For relatively pure sodium tripolyphosphate it is 32.783. The actual correction in peak position is then calculated using the formula:

(2) $$\text{correction} = \frac{-1.686 \sin 2\theta}{u}$$

where 2θ = Bragg angle measured, and $u$ is the linear absorption coefficient. In the case of "Product A," the peak position, after applying this correction is found to be 55.35° 2θ, while that for "Product B" is found (also corrected as above) to be 55.39° 2θ.

At this point, there is still no certainty, from the data observed that both "Product A" and "Product B" are not strained. Therefore, the samples already prepared as above are subjected to a prolonged tempering treatment at about 160° C. for 6 hours, in order to relieve any Form II crystalline strain that might be present in either sample. After the tempering treatment, both samples were again analyzed by the X-ray diffraction technique detailed above, and found to have, after being tempered, identical peak positions, at 55.39° 2θ, thereby proving that "Product A" had been strained significantly during the period in which it was cooled quickly through the critical temperature range, while the Form II crystals in "Product B," cooled more slowly through this temperature range, had not been strained significantly.

Products that contain the "strained" Form II sodium tripolyphosphate crystals of the present invention can also be described in terms of their "strain number," which in turn, is based upon the shift in one or more of the major peaks in the Form II X-ray diffraction spectrum. Thus, the "strained" sodium tripolyphosphate products of the present invention have been found to have "strain numbers" of at least about $25 \times 10^{-5}$, measured at the peak (described above) occurring at a 2θ Bragg angle within the range of from about 55.3 to about 55.4° 2θ. Such strain numbers are calculated (using as a "base" peak position the position of the X-ray diffraction peak based on unstrained material) using the following equation:

(3) $$e = \frac{\Delta d}{d}$$

where $e$ is the crystal "strain number," and $d$ is the interplanar spacing of the unstrained "base" peak, while $\Delta d$ is difference in interplanar spacing of the measured peak position, for the particular major Form II peak utilized, between the strained and unstrained material. In Example 1, above, the "strain number" of "Product A" is found to be $48 \times 10^{-5}$, using the peak position of the tempered product as the "base" peak position for Formula 3.

The following Table I illustrates the relative effect on a sodium tripolyphosphate product containing about 90% of the Form II crystalline modification of various rates of cooling on the "strain number" of the product (measured and calculated in accordance with the foregoing procedure):

TABLE I

| Average rate of cooling [1]: | Strain number |
| --- | --- |
| A. 30° C. per minute | $35 \times 10^{-5}$ |
| B. 40° C. per minute | $48 \times 10^{-5}$ |
| C. 50° C. per minute | $60 \times 10^{-5}$ |
| D. 55° C. per minute | $67 \times 10^{-5}$ |

[1] From 350° C. to 135° C.

It is not presently known whether the observed increase in cyrstalline strain (with increasing rates of cooling) illustrated in Table I, above, is due to a greater number or proportion of the Form II crystals being strained, or to a higher degree of strain being introduced into the crystals. However, a precise knowledge of the mechanism of this "strain" is not necessary for the successful practice of the present invention.

What is claimed is:

1. Crystalline sodium tripolyphosphate exhibiting a shift of at least about 0.01 degree at at least one of the major Form II sodium tripolyphosphate X-ray diffraction lines at Bragg angles greater than about 50 degrees $2\theta$.

2. Crystalline sodium tripolyphosphate having a strain number of at least about $25 \times 10^{-5}$ measured at a corrected $2\theta$ Bragg angle within the range of from about 55.3 to about 55.4 degrees.

3. A process for manufacturing a substantially anhydrous crystalline sodium tripolyphosphate containing strained low temperature form sodium tripolyphosphate crystals, which process comprises the step of lowering the temperature of a heated, substantially anhydrous sodium tripolyphosphate product containing at least some sodium tripolyphosphate in the low temperature crystalline form at an average rate of at least about 25° C. per minute through the temperature range of from about 350° C. to 125° C.

4. A process as in claim 3, wherein at least about 20 weight percent of the resulting sodium tripolyphosphate product is in the low temperature crystalline form, and said temperature range is from about 350° C. to about 140° C.

5. In a process for manufacturing a substantially anhydrous sodium tripolyphosphate product, at least part of which is in the low temperature crsytalline form, which process comprises calcining at a molecularly dehydrating temperature within the range of from about 250° C. to about 600° C. a mixture of sodium orthophosphate salts having an Na/P ratio of from about 1.4 to about 1.8 to thereby convert said mixture into said substantially anhydrous sodium tripolyphosphate product and subsequently cooling said substantially anhydrous sodium tripolyphosphate product; the improvement which comprises lowering the temperature of said substantially anhydrous sodium tripolyphosphate product through the temperature range of from about 350° C. to about 125° C. at an average cooling rate of at least about 25° C. per minute.

6. An improved process as in claim 5, wherein at least about 70 weight percent of said sodium tripolyphosphate product is in the low temperature crystalline form.

References Cited

UNITED STATES PATENTS

| 2,419,147 | 4/1947 | King | 23—106 |
| 3,063,801 | 11/1962 | Groves | 23—107 |

OTHER REFERENCES

Partridge et al.: J. Amer. Chem. Soc. 63, 1941 (pages 454–466).

Van Wazer: Volumes I and II, Phosphorous and Its Compounds, Interscience, 1958 (volume I, pages 642–648; volume II, pages 1217–1219).

OSCAR R. VERTIZ, *Primary Examiner.*

O. F. CRUTCHFIELD, L. A. MARSH,
*Assistant Examiners.*